UNITED STATES PATENT OFFICE.

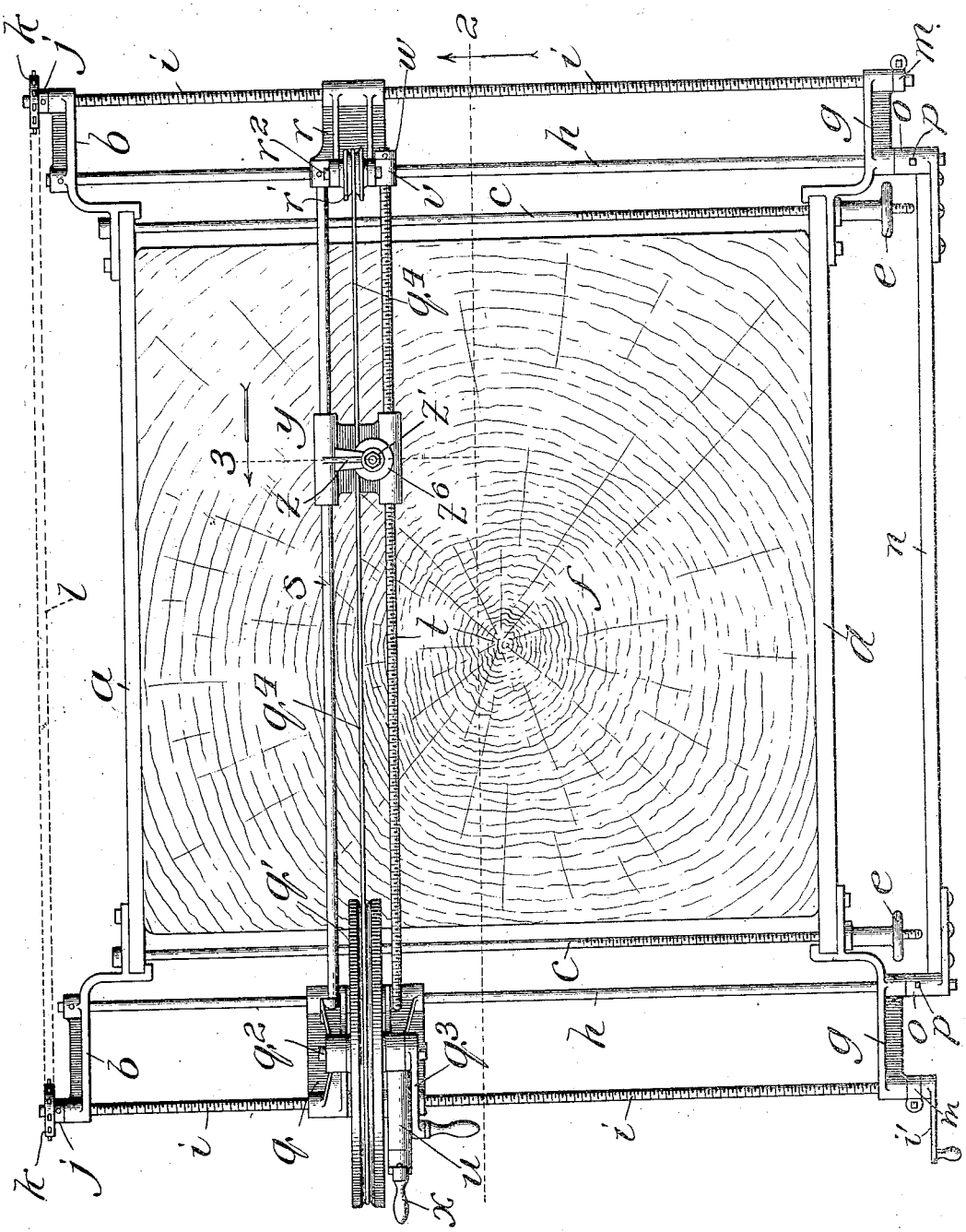

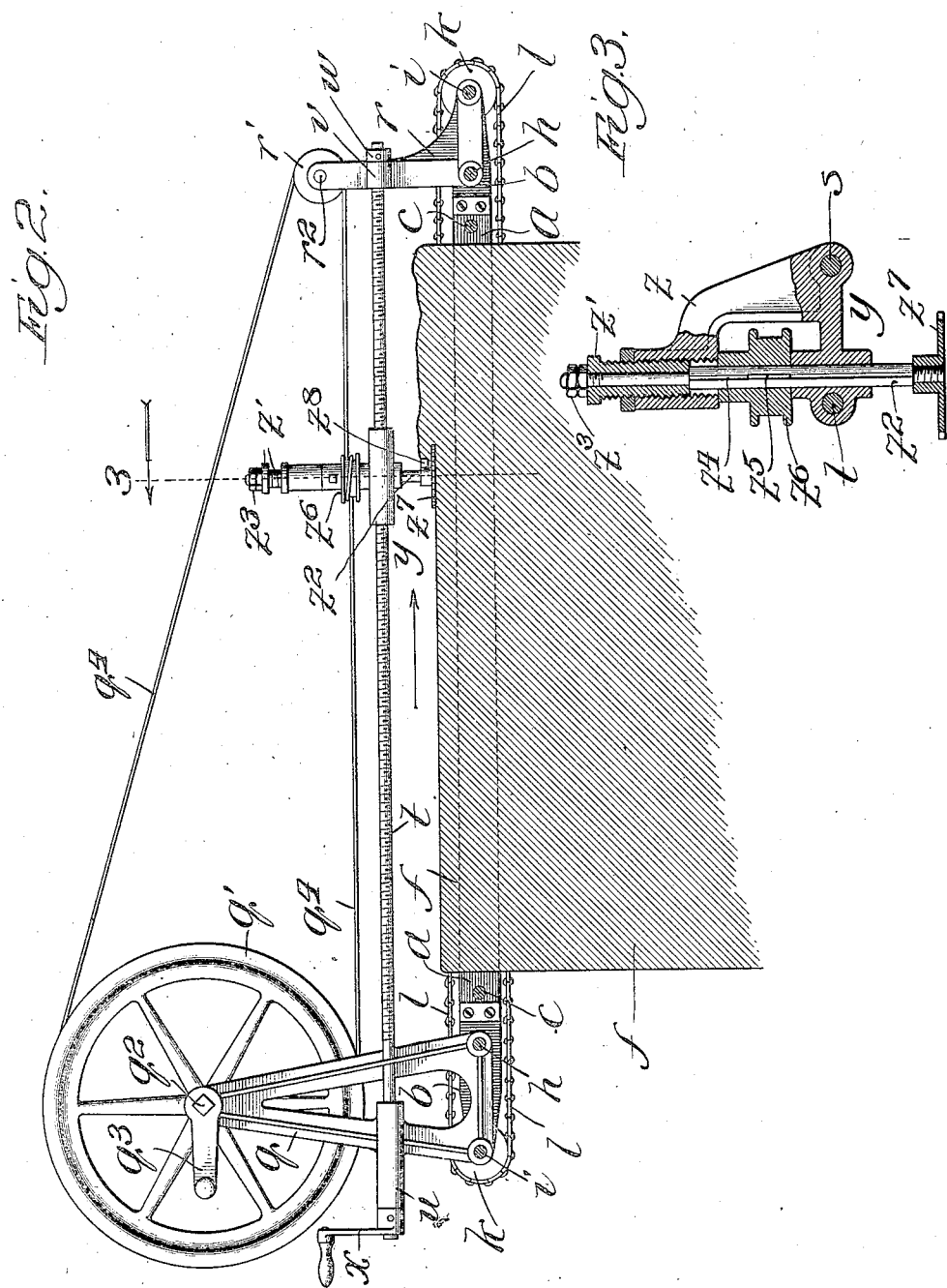

DANA R. INGRAM, OF CHICAGO, ILLINOIS.

MACHINE FOR SURFACING BUTCHERS' BLOCKS.

No. 844,022.　　　Specification of Letters Patent.　　　Patented Feb. 12, 1907.

Application filed July 9, 1906. Serial No. 325,378.

To all whom it may concern:

Be it known that I, DANA R. INGRAM, a citizen of the United States, residing at Chicago, in the county of Cook and State of Illinois, have invented certain new and useful Improvements in Machines for Surfacing Butchers' Blocks, of which the following is a description, reference being had to the accompanying drawings, forming a part of this specification, in which corresponding letters of reference in the different figures indicate like parts.

The object of my invention is to provide a simple and inexpensive machine which shall be so constructed as to enable it to be clamped to an ordinary butcher's block or other similar article and operated in such a way as to rapidly and uniformly surface said block, so as to leave its top smooth and level, all of which is hereinafter more particularly described, and definitely pointed out in the claim.

In the drawings, Figure 1 is a plan view of my improved surfacing-machine as the same would appear when clamped to a butcher's block. Fig. 2 is a vertical sectional view thereof, taken upon the line 2, Fig. 1, viewed in the direction of the arrow there shown; and Fig. 3 is a vertical sectional view of a portion of said machine, taken upon the line 3, Figs. 1 and 2, viewed in the direction of the arrows therein shown.

Referring to the drawings, $a$, Figs. 1 and 2, represents a bar preferably formed from angle-iron, which constitutes a part of the frame, the length of said bar being somewhat greater than the length or width of the largest block to which it would be attached. Bolted or otherwise rigidly attached to the ends of said bar are cast arms $b\ b$ for the purpose hereinafter stated. Projected through the ends of said bar $a$ at right angles thereto are clamping-rods $c\ c$, a considerable portion of each of which is screw-threaded, as shown. The length of said rods is somewhat greater than the largest block with which they would be used. Said rods are adapted to be extended loosely through bores in the respective ends of the clamping-bar $d$, which corresponds to and is arranged parallel with the bar $a$. Hand-nuts $e\ e$ upon the ends of the rods $c$ enable the bars $a\ d$ to be clamped rigidly against the sides of the block $f$.

Arms $g\ g$, corresponding to the arms $b\ b$, are rigidly attached to the ends of the bar $d$. Extending through the bores in the arms $b\ b$ and $g\ g$, so as to connect the same with each other, are parallel guide-rods $h\ h$, and also journaled in bearings in the outer ends of said arms are parallel screw-threaded rods $i\ i$, each of which is provided with a collar $j$ and sprocket-wheel $k$ upon the end. A sprocket-chain $l$ serves to connect the wheels $k\ k$ and to cause them to rotate in unison for the purpose hereinafter stated. Collar-clamps $m\ m$, Fig. 1, are also adjustably attached to the opposite ends of the screw-rods $i\ i$ to prevent endwise movement thereof when said rods are rotated. I prefer to connect the ends of the parallel slide-rods $h$ by means of a bar $n$, which is provided with suitable fittings $o\ o$, bored to receive said rods and adjustably clamped thereto by means of set-screws $p$. A slide block or frame $q$, having a smooth horizontal bore to receive the rod $h$ upon the left hand and a screw-threaded bore to receive the adjacent screw-rod $i$, is mounted upon said rod and screw, respectively, while a somewhat similar frame or block $r$ is mounted in the same manner upon the corresponding bar $h$ and screw-rod $i$ at the right. The parts $q\ r$ are connected with each other by means of a transverse rod $s$, rigidly attached thereto at its ends, and a screw-threaded rod $t$, the latter being mounted in the bearings $u\ v$ and provided with a collar $w$ at one end and a crank $x$ at the other, the hub of which forms a collar to prevent endwise movement. The parts $q\ r$ and their intervening connections form a carriage, which I term the "main" carriage of the machine. This main carriage is adapted to support a subsidiary carriage, which in turn is adapted to be moved upon said main carriage in a plane at right angles to the plane of the pathway of the latter. Said subsidiary carriage consists of a sliding frame generally designated by $y$, the base of which is provided with a bore through which the rod $s$ is loosely projected and another which is screw-threaded to receive the screw-rod $t$. An arm $z$ is projected upwardly and the head thereof tapped to receive a screw-threaded regulating-sleeve $z'$, through which is projected a vertical shaft $z^2$, that portion of which is inclosed in the part $z'$ being of lesser diameter than that below; while a lock-nut $z^3$ is secured upon the upper end, so that the turning of the screw-sleeve $z'$ may serve to raise or lower the shaft. The enlarged portion of the shaft is provided with a longitudinal groove $z^4$, into which is loosely projected a key $z^5$, by which a pulley $z^6$ is connected with said shaft. Said pulley is otherwise loose upon the shaft, which is free to move vertically therethrough while rotated thereby. Upon the lower end of said shaft is mounted a rotary saw or cutter $z^7$, arranged to operate in a horizontal plane, while immediately above the same and attached to or formed upon the same hub is a cutting or chipping device $z^8$, which is intended to remove the portion partially severed by the saw.

A driving-pulley $q'$ is mounted upon a shaft $q^2$, which is supported in bearings in the part $q$ and is adapted to be rotated by means of the crank $q^3$. A pulley $r'$ is also mounted upon a shaft $r^2$, journaled in the part $r$. A belt $q^4$ is trained around the pulleys $q'$, $r'$, and $z^6$ to drive the latter.

Having described the various parts of my improved device, I will now explain its operation. The clamping-frame is placed upon the block $f$, and when the bars $a\ d$ are adjusted to the proper level they are firmly clamped against the sides of the block by means of the hand-nuts $e$. The projecting end of one or both of the screw-rods $i$ being squared, a crank $i'$ is placed thereon and operated, which causes both of the screws $i$ to rotate in the same direction. The main carriage is thereby moved upon the guide-rods $h$ until it stands over the edge of the block $f$. The crank $x$ is then turned so as to cause the secondary carriage to stand over one corner of said block. The cutting-tool $z^7$ is then vertically adjusted by means of the screw $z'$ to the exact height necessary to make the proper cut upon the block. The machine is then ready for operation. Upon turning the crank $q^3$ the cutting-tool $z^7$ is caused to rotate at a high speed. At the same time the crank $x$ is turned in a direction to move the carriage $y$ across the block, the rate of movement corresponding to the speed at which it is desired to advance the cutter. When one cut is made across the block, the machine is temporarily stopped and the screws $i$ are turned to move the main carriage forward a sufficient distance to provide for a new cut. The crank $q^3$ is then rotated in the same and the crank $x$ in an opposite direction, thereby reversing the movement of the carriage $y$ and causing a new cut across the block. With each complete cut the screws $i$ are turned to provide for a new one, and the carriage $y$ is thus moved back and forth until the entire block is surfaced. Inasmuch as the guide-rods $h\ h$ and $s$ form horizontal guides for the respective carriages, it follows that the cutting-tool will always move in the same horizontal plane, regardless of its location with respect to the edges of the block. The work of my improved machine is rapid, smooth, and accurate, and its advantages are too obvious to require special comment.

I do not wish to be confined to the specific construction, as it is obvious that the same may be considerably varied without departing from the spirit of the invention involved.

Having thus described my invention, I claim—

In a device of the class described, the combination of parallel clamping-bars connected at the respective ends by means of screw-threaded rods having clamping-nuts thereon, parallel supporting-rods connected with arms attached to the respective ends of said clamping-bars at right angles thereto, one of each pair of said supporting-rods being screw-threaded, means for rotating one of said rods, means for connecting said rods to cause them to rotate in unison, frames mounted upon each of said pairs of supporting-rods, parallel rods for connecting said frames, one of which is screw-threaded, a carriage mounted upon said last-named parallel rods, a vertical shaft having bearings in said carriage with a revoluble cutter upon its lower end, and means for actuating said shaft as the carriage is being moved in either direction.

In testimony whereof I have signed this specification, in the presence of two subscribing witnesses, this 29th day of June, 1906

DANA R. INGRAM.

Witnesses:
D. H. FLETCHER,
CARRIE E. JORDAN.